July 16, 1940.  G. SMOLAK  2,208,232
ELECTRICAL INSULATING PANEL
Filed June 21, 1937
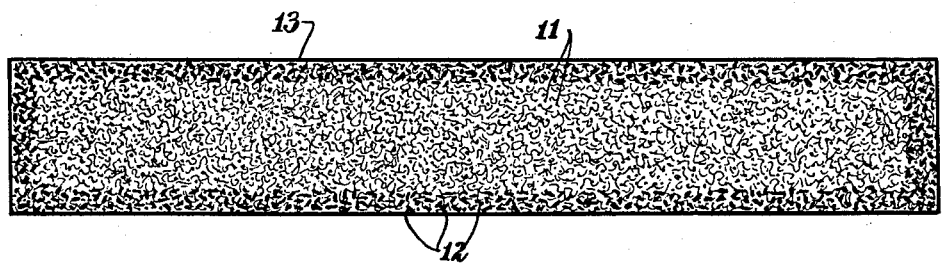
INVENTOR.
George Smolak.
BY Virgil C. Kline
ATTORNEY Patented July 16, 1940

2,208,232

UNITED STATES PATENT OFFICE 2,208,232

ELECTRICAL INSULATING PANEL

George Smolak, Somerville, N. J., assignor to Johns-Manville Corporation, New York, N. Y., a corporation of New York Application June 21, 1937, Serial No. 149,417

5 Claims. (Cl. 175—298)

This invention relates to an article of manufacture. It relates, more particularly, to a fibre-reenforced cementitious sheet including a water-repellent agent incorporated therein and additional means associated with outer portions of the sheet for reducing penetration by moisture.

The product of the invention is useful for various structural purposes, as, for instance, in the construction of buildings. It is especially advantageous as an electrical insulator, in various shapes, and as a support for electrical equipment, such as terminals, or switches. Such supports are hereinafter referred to as switchboard panels and the invention will be exemplified by description in connection with such panels.

Asbestos and cement sheets, if used in unimpregnated form for electrical insulators or switchboard panels show low dielectric strength when wet. If impregnated with asphalt or the like in the usual manner, they are susceptible to carbonizing. If made with a calcium aluminate cement, they are relatively expensive.

The present invention provides a relatively inexpensive and strong sheet, having little tendency to carbonize and develop conducting paths on exposure to arcing or short circuiting, of minimized capacity for absorbing water, and of high dielectric strength on exposure to moisture.

The preferred embodiment of the invention is illustrated in the drawing to which reference is made. The drawing shows a sectional view of a sheet made according to the invention and illustrates the distribution of materials within the sheet, even though some of them are not visible to the eye.

There are shown sheets constituted largely of an intimate mixture of inorganic fibres, a hydraulic cement and water-repellent material, the cement being in hardened condition.

There may be used a water-repellent agent 11 distributed substantially uniformly throughout the entire sheet and means associated with the exterior portions of the sheet for reducing further the penetration of the sheet by water to which it may be exposed. These means include (a) a water-repellent composition 12 impregnated into the outer portions of the article and closing the pores therein against penetration by water and/or (b) a layer 13 of substantially water-impenetrable and electrical insulating material applied over the exterior surface of the article.

In the structures described, the water-repellent material is present in greater proportion in the exterior portions than in the interior of the articles.

In general, the method of manufacture comprises forming an intimate mixture of inorganic fibres, a hydraulic cement, water in excess and, also, the waterproofing agent 11 (if such an agent is to be distributed throughout the finished product), shaping and strongly compressing the mixture, with the expression of excess water, hardening the compressed product and then applying the composition 12 and/or the layer 13.

The fibres selected should be inorganic, so that they are not subject to charring or burning when exposed to elevated temperatures and should be such as to reenforce the cement, in order to give a product of desired high breaking strength. Among such fibres that may be used are asbestos fibres particularly those of the chrysotile, crocidolite or amosite variety. The chrysotile variety when used in the product gives good results and is therefore the preferred type of fibres. While various lengths and grades of the fibres may be used, I prefer a variety of medium to relatively short length such as conventionally used in the manufacture of asbestos and Portland cement shingles or siding units.

The hydraulic cement used should be one that is not decomposed at temperatures to which it may be exposed on the surface of a switchboard panel and that is adapted to give a strong water-resistant composition, when used in the manner herein described. Thus, there may be used Portland cement or a high calcium aluminate cement (such, for example, as the kind known as "Luminite"). While the aluminate cement has a lower moisture absorption capacity than the Portland cement, my improved product is made so low in moisture absorption, in any event, that the less expensive Portland cement is satisfactory and is preferred, because of the economy resulting from its use.

The proportions of fibres to Portland cement may be about those that are usual in asbestos cement sheets now in use for similar purposes. Thus, for switchboard panels, there may be used approximately equal parts by weight of the asbestos fibres and Portland cement, say, 25 to 70 parts of the fibres to 100 parts of the total mixture.

The water-repellent agent 11, if used at all, is distributed substantially uniformly throughout the entire article.

For this agent there is used, to advantage, a substance or mixture of substances of pronounced negative capillarity for water and one that is not of deleterious effect upon or adversely affected by the other ingredients of the finished article. Examples of such agents that may be used are the water-repellent soaps of the multivalent metals, such as a soap of aluminum or zinc. A soap of these metals in which the fatty acid component present is largely stearate is preferred. For some purposes, there may be used, as the agent 11, a small proportion of very finely divided or dispersed paraffin wax or the like.

The water-repellent composition 12 is, preferably, one that also has pronounced negative capillarity for water, is chemically inert towards the other ingredients of the composition and is not susceptible to objectionable bleeding or carbonizing, under conditions of use of the finished article. The composition is one adapted, advantageously, to close the pore spaces in portions of the article into which it is impregnated. Further, this composition should also be one adapted not to undergo loss of water-repellency with age, as, for example, by crystallization or other change in physical properties. It should preserve its original effective form.

For this composition, there may be used a water-repellent wax composition of little or no tendency to crystallize on long usage of the article and of properties adapting it to be applied in fluent condition and then to become relatively nonfluent or solid. A suitable composition is one containing paraffin wax and an admixed protective substance minimizing the tendency of the wax to crystallize on long standing, after being impregnated into the outer portions of the improved sheet. Such substance may act as a protective colloid or by lowering of the crystallization temperature of the wax. Suitable protective substances are the soaps of magnesium, zinc, or aluminum, the magnesium soap including a large proportion of stearate being preferred at this time.

The proportions of the said water-repellent agent and water-repellent composition may be varied within limits. However, the proportion of either or of both combined should not be so great as to affect excessively the strength of the finished sheet. On the other hand, the proportions of the materials should be adequate to give the desired overall water-repellency necessary to preserve a satisfactory dielectric strength of the panel on exposure to moisture. With these general requirements as to proportions in view, there may be used 1 to 5 parts by weight, say, 2 parts of the agent 11 to 100 parts of the finished article and 3 to 10 per cent of the composition 12 on the weight of the said article. The said composition is preferably concentrated in the outer portions of the product, say, in the outer one-sixteenth to one-fourth inch for an article of thickness of an inch or so.

When it is desired to give to the article a surface coating of a finishing film, to establish a desired color or appearance, such, for example, as one similar to that of natural ebony, a continuous film or layer 13 of water-impenetrable and electrical insulating material is applied over the exterior of the article. The material of this layer is one that is substantially insoluble in and a non-solvent for the water-repellent agent 11 or the water-repellent material 12, with one or both of which the layer 13 contacts. Specific compositions that may be used to advantage in the layer 13 are the alcohol-soluble (commonly referred to as spirit-soluble) and hydrocarbon-insoluble finishing materials. Shellac is perhaps the best of these materials, when all features are considered, including original cost and ease of application. Another material that may be used as the chief ingredient of the layer 13 is mazein, a corn protein mixture that is soluble in alcohol but insoluble in water, simple esters and hydrocarbons.

The method of manufacture and the resulting product is illustrated more specifically by the following example.

There is formed an intimate mixture of Portland cement, chrysotile asbestos fibres, manganese dioxide or other noncarbonizing pigment of desired color, aluminum stearate as a water-repellent agent and water, suitable proportions by weight of the last three ingredients, for 100 parts of all dry materials, being about 5 parts of manganese dioxide, 2 of aluminum stearate and 250 of water.

The mixture is transferred to the bed of a hydraulic press constituting a filtering mold, with a properly supported screen bottom. Compression and shaping in the mold is then produced, say, at a maximum pressure of 1,400 to 2,500 pounds to the square inch. The compression is continued for a short time only, until the rate of outflow of expressed water becomes small. The pressing is then discontinued, the strongly compressed and shaped sheet is removed from the press, for best results is repressed against a wire screen as described on page 2 of U. S. Patent 2,080,285 issued to John C. MacIldowie on May 11, 1937, and the Portland cement in the compressed sheet is hardened by being allowed to stand at atmospheric temperature for about a month.

The hardened material is then impregnated with the water-repellent composition 12. Suitably, the hardened sheet is first dried at an elevated temperature, as, for instance, at approximately 250° F., until there is practically no further loss in weight, is cut to size and, if necessary, is sanded or otherwise smoothed over the face thereof that is to be exposed during use. The sheet is then immersed in the water-repellent composition maintained in fluid condition and allowed to stand therein until the desired proportion of impregnating material is absorbed. For example, the dried sheet may be immersed in a warmed composition including paraffin wax and the selected admixed protective substance, to minimize subsequent crystallization of the wax, in the proportion of 1 to 5 parts by weight of the protective substance to 100 parts of the wax. Thus, there may be used a melted composition including 98% of paraffin wax and 2% of magnesium stearate and the sheet allowed to absorb about 3 to 10% and, preferably, about 5% by weight of the said composition, this amount being that which remains in the sheet subsequent to draining it.

The impregnated sheet is removed from the impregnating composition, is allowed to drain, and is cooled to room temperature.

To the sheet so made, there may then be applied the film 13, as by spraying or otherwise coating the sheet with a solution of shellac or the like in a volatile solvent or solvent mixture therefor that does not cause bleeding or solution of the water-repellent agent or composition in the sheet. Thus, shellac may be applied in a composition which is very high in alcohol content, say, in content of methanol or ethanol mixed with butyl or amyl alcohol to retard evaporation and promote smoothness of film.

The layer 13 should be applied so as to give a continuous film and should contain a very high proportion of non-carbonizing and substantially non-conducting pigment or pigments, to establish a desired color, the pigment or pigments being incorporated into the solution of finishing material before it is applied to the sheet.

The volatile solvent used in applying the shellac or the like is allowed to evaporate, in the usual manner.

Typical sheets one inch thick, made as described, show, on the average, approximately the following properties: modulus of rupture, 4,500 pounds; water absorption, on 48 hours immersion, 1.10%; dielectric strength, after 24 hours immersion in water, 63 volts per mil; combined surface and volume leakage 0.4 milliampere for 20,000 volts..

It will be understood that these properties vary considerably from one sample to another and that the numerical properties are given only to illustrate the general high order of quality of the product.

It will be understood, also, that the details given are for the purpose of illustration, not restriction, and that variations within the spirit of the invention are intended to be included in the scope of the appended claims.

What I claim is:

1. An electric switchboard panel comprising a shaped and compressed intimate mixture of asbestos fibres and Portland cement in hardened condition, a water-repellent agent distributed in small proportion throughout the mixture and a water-repellent composition, in addition to the said agent, impregnating the outer portions of the panel, the said composition including a wax and a protective substance minimizing crystallization of the wax.

2. An electrical insulating sheet including a compressed intimate mixture of inorganic fibres, a hydraulic cement in hardened condition and a water-repellent composition distributed throughout the outer portions at least of the sheet, the water-repellent composition including paraffin wax and an admixed water-repellent soap of a multivalent metal.

3. An electrical insulating panel or the like comprising a shaped and compressed mixture of asbestos fibres and cement, a water-repellent agent distributed in small proportions throughout the mixture, a second water-repellent agent impregnating and closing the pores adjacent the outer faces of the panel, and a finish film extending over a face of the panel, said film being substantially a non-solvent for and insoluble in the said agents.

4. An electrical insulating panel or the like comprising a shaped and compressed mixture of asbestos fibres and cement, a water-repellent agent distributed in small proportions throughout the mixture, a second water-repellent agent impregnating and closing the pores adjacent the outer faces of the panel, and a finish film extending over a face of the panel, said film being substantially a non-solvent for and insoluble in the said agents and including a high proportion of a substantially non-carbonizing and non-conducting pigment.

5. An electrical insulating panel or the like comprising a shaped and compressed mixture of asbestos fibres, cement, and a water-repellent soap of a multivalent metal in the proportion of the order of 2 parts by weight of the soap to 100 parts of the mixture, a water-repellent composition impregnating and closing the pores adjacent the outer faces of the panel, and a finish film extending over a face of the panel, said film being substantially a non-solvent for and insoluble in the said composition.

GEORGE SMOLAK.